United States Patent Office 3,413,224
Patented Nov. 26, 1968

3,413,224
ANTIOXIDANTS
Gordon G. Knapp, Southfield, Mich., assignor to Ethyl Corporation, New York, N.Y., a corporation of Virginia
No Drawing. Original application June 1, 1961, Ser. No. 114,003, now Patent No. 3,251,821, dated May 17, 1966. Divided and this application Feb. 4, 1966, Ser. No. 525,133
6 Claims. (Cl. 252—47.5)

ABSTRACT OF THE DISCLOSURE

Dialkyl hydroxy thiobenzamides are prepared by reacting sulfur with the corresponding dialkyl hydroxy benzyl amine or by reacting the corresponding dialkyl hydroxy benzaldehyde with sulfur and a secondary amine. Compounds prepared in this manner are 2,6-di-tert-butyl-4-[morpholino(thiocarbonyl)]phenol and 3,5-di-tert-butyl-4-hydroxy-N,N-dimethylthiobenzamide. These compounds and the reaction solvent remaining after their removal are antioxidants.

---

This application is a division of application Ser. No. 114,003, filed June 1, 1961, now U.S. 3,251,821.

This invention relates to a novel class of compounds, their preparation and their use as antioxidants. More particularly it relates to a novel and unusual class of 3,5-dialkyl-4-hydroxythiobenzamide compounds, methods for their preparation and the employment of these novel compounds as stabilizers and antioxidants for organic materials. This invention also relates to other novel and useful reaction products possessing extraordinary antioxidant properties.

It is an object of this invention to provide a novel class of chemical compounds. A further object is to provide methods for preparation of these compounds. Another object is to provide novel reaction products. Still another object is to provide novel compositions of matter comprising organic material stabilized against oxidative deterioration. A specific object of this invention is to provide lubricating oil stabilized against oxidative deterioration. Another specific object is to provide greases stabilized against oxidative deterioration. Still another object is to provide turbine and other industrial oils stabilized against oxidative deterioration. Other objects will become apparent from the following description of the invention.

The above and other objects are accomplished by provision of a compound having the formula (I)
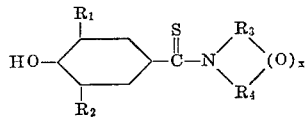

wherein $x$ is 0 or 1, $R_1$ and $R_2$ are each independent alkyl groups containing from 1 to 20 carbon atoms, $R_3$ and $R_4$ each independently selected from the group consisting of alkyl, cycloalkyl, aralkyl, aryl and alkaryl when $x=0$ and the ethylidene group when $x=1$.

In the above compounds it is preferable that the hydrocarbon radicals of the groups designated above as $R_3$ and $R_4$ contain the following ranges of carbon atoms: alkyl, 1 to 20; cycloalkyl, 5 to 6; aralkyl, 6 to 11; aryl, 6 to 10; and alkaryl, 7 to 15. These ranges are found to give antioxidants which are more readily prepared and more effective.

In referring to the alkyl substituents in $R_1$ and $R_2$, it is understood that these substituents may be aryl substituted, that is, may be aralkyl groups.

When $x$ in the above formula is 0 an embodiment of this invention is a thiobenzamide compound in which the hydrocarbon radicals of the groups designated above as $R_3$ and $R_4$ are alkyl groups having up to 20 carbon atoms.

When $x$ in the above formula is 1 an embodiment of this invention is a 2,6-dialkyl-4-[morpholino-(thiocarbonyl)] phenol in which the alkyl groups may be alkyl or aralkyl and have up to 20 carbon atoms. Examples of the compounds of this invention include 3-n-decyl-4-hydroxy-5-(1,1-dimethyl-n-tetradecyl) N-α-methylbenzyl-N-cyclohexylthiobenzamide;
3,5-diethyl-4-hydroxy-N-(1-methyl-n-butyl)-N-phenylthiobenzamide;
4-hydroxy-3-n-propyl-5-p-n-tridecylbenzyl-N-methyl-N-isopropylthiobenzamide;
3,5-di-tert-butyl-4-hydroxy-N,N-dimethylthiobenzamide;
3,5-di-n-octyl-4-hydroxy-N,N-dibenzylthiobenzamide;
2,6-di-tert-butyl-4-[morpholino-(thiocarbonyl)]phenol;
2,6-di-(α,α-methylbenzyl)-4-[morpholino-(thiocarbonyl)]phenol;
2,6-diethyl-4-[morpholino-(thiocarbonyl)]phenol;
3,5-di-(α,α-dimethylbenzyl)-4-hydroxy-N-naphthyl-N-p-methylphenylthiobenzamide;
3-benzyl-5-sec-butyl-4-hydroxy-N-n-butyl-N-(1-methyl-n-decyl)thiobenzamide;
2,6-di-n-eicosyl-4-[morpholino-(thiocarbonyl)]phenol;
3,5-di-n-eicosyl-4-hydroxy-N,N-di-n-propylthiobenzamide;
3,5-dimethyl-4-hydroxy-N,N-di-n-eicosylthiobenzamide; and
3,5-di-α-methylbenzyl-4-hydroxy-N,N-diethylthio benzamide.

The compounds of this invention are water insoluble and non-polar. They range from white to yellow crystalline solids to viscous amber liquids. They are ashless and non-volatile, facilitating their incorporation into a wide range of organic material.

A preferred embodiment of this invention consists of compounds of the above formula wherein $R_1$ is an alkyl group having from 1 to 12 carbon atoms and $R_2$ is an alpha-branched alkyl group having from 3 to 12 carbon atoms. These compounds are more effective antioxidants than other compounds within the scope of this invention. Among the compounds represented by this embodiment are 3,5-di-tert-butyl-4-hydroxy-N,N-di-n-octadecylthiobenzamide;
3 - n - butyl - 4 - hydroxy-5-(1-methyl-n-pentyl-N-(1,1-dimethyl - n-pentyl)-n-(1,1-dimethyl-n-tridecyl)thiobenzamide;
4-hydroxy-3,5-diisopropyl-N-n-hexyl-N-p-n-nonylphenylbenzamide;
3,5-di-tert-butyl-4-hydroxy-N-n-butyl-N-phenylthiobenzamide;
2-tert-butyl-6-methyl-4-[morpholino-(thiocarbonyl)]phenol;
4-hydroxy-3,5-di-n-pentyl-N,N-dicyclopentylthiobenzamide;
3-tert-butyl-4-hydroxy-5-methyl-N,N-dimethylthiobenzamide;
3,5-diisopropyl-4-hydroxy-N,N-di-n-tetradecylthiobenzamide; and
3-tert-butyl-4-hydroxy-5-methyl-N,N-di-n-dodecylthiobenzamide.

A particularly preferred embodiment of this invention is a compound of Formula I in which $R_1$ is an alkyl group of from 1 to 12 carbons atoms, $R_2$ is an alpha-branched alkyl group of from 3 to 12 carbon atoms, $x$ is 1 and $R_3$ and $R_4$ are ethylidene groups. These compounds are particularly preferred because of their greater stability and greater antioxidant ability. Examples of the compounds of this embodiment include
2-methyl-6-tert-octyl-4-[morpholino-(thiocarbonyl)]-phenol;
2,6-di-tert-butyl-4-[morpholino-(thiocarbonyl)]-phenol;
2-n-butyl-6-(1-methyl-n-pentyl)-4-[morpholino-(thiocarbonyl)]-phenol;
2-tert-butyl-6-methyl-4-[morpholino-(thiocarbonyl)]-phenol; and
2,6-diisopropyl-4-[morpholino-(thiocarbonyl)]-phenol.

Another particularly preferred embodiment of this invention are compounds of Formula I wherein $R_1$ is an alkyl group of from 1 to 12 carbon atoms, $R_2$ is an alpha-branched alkyl group of from 3 to 12 carbon atoms, $x$ is 0 and $R_3$ and $R_4$ are alkyl groups of from 1 to 20 carbon atoms. These compounds are preferred because of their greater stability and because they are more effective antioxidants for oxygen-sensitive oils. Examples of the compounds of this embodiment include 3,5-diisopropyl-4-hydroxy-N,N-di-n-hexyldecylthiobenzamide; 3 - tert-butyl-5-(1-ethyl-n-decyl)-4-hydroxy-N,N-di-tert - butylthiobenzamide; 3-tert-butyl-4-hydroxy-5-methyl-N,N-di-n-tridecylthiobenzamide; 3-tert-butyl-5-methyl-4-hydroxy-N,N-di-n-eicosylthiobenzamide; 3,5-di-tert-butyl-4-hydroxy-N,N-di-n-octylthiobenzamide; and 4-hydroxy-3 - methyl-5-tert-octyl-N-N-di-n-nonylthiobenzamide.

The most particularly preferred embodiment of this invention are those compounds in which $R_1$ is an alkyl group of from 1 to 12 carbon atoms, $R_2$ is an alpha-branched alkyl group of from 3 to 12 carbon atoms, $x$ is 0, and $R_3$ and $R_4$ are methyl groups. These compounds are most particularly preferred because they have unequaled antioxidant activity in lubricating oils. Examples of the compounds of this embodiment include 3,5-di-tert-butyl-4-hydroxy-N,N-dimethylthiobenzamide; 3-tert-butyl-4-hydroxy-5-methyl-N,N-dimethylthiobenzamide and 3,5-diisopropyl-4-hydroxy-N,N-dimethylthiobenzamide.

The novel compounds of this invention can be prepared by two methods. In one embodiment of this invention the compounds are prepared by reacting a benzyl amine with sulfur. Thus, 3,5 - di-tert-butyl-4-hydroxy-N,N-dimethylthiobenzamide is readily prepared by reacting 2,6-di-tert-butyl-α-dimethylamino-p-cresol with sulfur. Likewise, 2,6-di-tert-butyl-4-[morpholino-(thiocarbonyl)]-phenol is prepared by the reaction of 2,6-di-tert-butyl-α-morpholino-p-cresol with sulfur.

The above reactions can be illustrated by the following general equation:

(II)
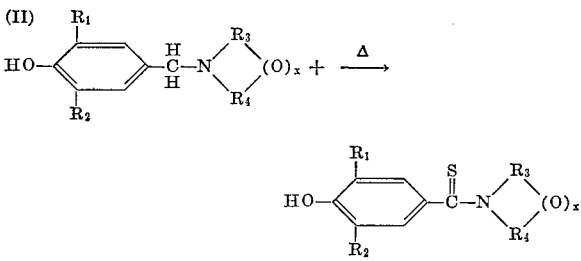

wherein $R_1$, $R_2$, $R_3$, $R_4$ and $x$ are as in Formula I.

The preparation of the 2,6-dialkyl-α-dihydrocarbonamino-p-cresols is described in U.S. Patent No. 2,962,531. They can be prepared by reacting a 2,6-dialkylphenol with a dihydrocarbonamine and formaldehyde. Thus, 2,6-di-tert-butyl-α-dimethylamino-p-cresol can be prepared by reacting 2,6-di-tert-butylphenol with dimethylamine and formaldehyde.

The preparation of the 2,6-dialkyl-α-morpholino-p-cresols are disclosed in an application filed concurrently with the present application entitled "Organic Aromatic Compounds," the inventor being Harold D. Orloff. They can be prepared by reacting a 2,6-dialkylphenol with morpholine and formaldehyde. Thus 2,6-di-tert-butyl-α-morpholino-p-cresol can be prepared by reacting 2,6-di-tert-butylphenol with morpholine and formaldehyde.

The temperatures employed in the reaction of Equation II vary from about 100° C. to the reflux temperature of the reaction mixture, but no higher than 300° C., at reaction times of from a few minutes to one week or more to give a good yield of product.

A preferred temperature range is from about 130° C. to about 220° C. At this temperature range the reaction proceeds smoothly, at a sufficiently rapid rate to give a good yield of product in a reasonable time with a minimum of undesirable side reactions.

In another embodiment of this invention the compounds are prepared by reacting a 3,5-dialkyl-4-hydroxybenzaldehyde, sulfur and an amine. Thus 3,5-di-tert-butyl-4-hydroxy-N,N-dimethylthiobenzamide is readily prepared by reacting 3,5-di-tert-butyl-4-hydroxybenzaldehyde with sulfur and dimethylamine. Likewise, 2,6-di-tert-butyl-4-[morpholino-(thiocarbonyl)]-phenol is prepared by the reaction of 3,5-di-tert-butyl-4-hydroxybenzaldehyde with sulfur and morpholine. The above reaction can be illustrated by the following general equation:

(III)
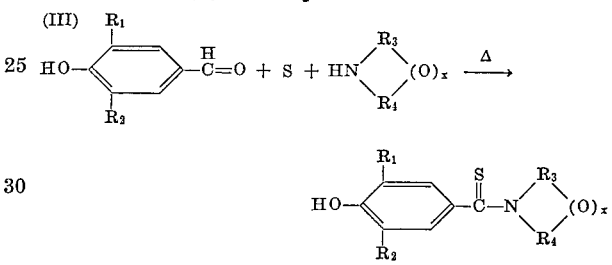

wherein $R_1$, $R_2$, $R_3$, $R_4$ and $x$ are as in Formula I.

The preparation of the 3,5-dialkyl-4-hydroxybenzaldehydes is described in application Ser. No. 77,276 (now abandoned) entitled "Stabilized Plastic" filed Dec. 21, 1960, the inventors being Gordon G. Knapp and Calvin J. Worrel. They can be prepared by the bromination of the corresponding 2,6-dialkyl-p-cresol in the presence of alcohol with a subsequent hydrolysis of the brominated cresol. Thus 3,5-di-tert-butyl-4-hydroxybenzaldehyde can be prepared by brominating 2,6-di-tert-butyl-p-cresol and subsequently hydrolyzing the brominated cresol.

The temperatures employed in practicing this embodiment vary from about 50° C. to the reflux temperature of the highest boiling reaction mixture, about 300° C., at reaction times of from a few minutes to one week or more to give a good yield of product.

A preferred temperature range is from about 80° C. to about 135° C. In this temperature range the reaction proceeds rapidly giving a high yield of product with a minimum of undesirable side reactions.

In both the above reactions, in order to insure complete utilization of the starting phenolic compound, it is desirable to use an excess of sulfur. Furthermore, in order for the reaction to proceed more efficiently, elevated pressures may be employed.

Both reactions may be conducted with or without the aid of a solvent. For most of the compounds it is preferred not to use a solvent due to the lack of solubility of free sulfur. However, for certain compounds a solvent may be desired where the phenolic compound is a high melting solid and not liquid at the reaction. Further, when using lower boiling amines a solvent may be desired to facilitate the reaction. Such solvents are the higher boiling glycol ethers and alcohols such as ethylene glycol-mono-n-butyl ether, ethylene glycol monophenylether, ethylene glycol monobenzyl ether, n-hexyl alcohol, cyclohexanol, n-octyl alcohol, capryl alcohol, n-decyl alcohol, lauryl alcohol, mesityl alcohol, cetyl alcohol, stearyl alcohol, benzyl alcohol, n-heptyl alcohol, n-nonyl alcohol, n-undecyl alcohol, and n-dodecyl alcohol. When lower temperatures are desired other solvents may be used such as dioxane or pyridine.

In conducting the reaction of Equation III a convenient solvent is the amine reactant itself. When using such a solvent a convenient reaction temperature is the boiling point of the amine. Thus, when using morpholine as a solvent a temperature of from 125–130° C. is desirable. Further, when using lower boiling amines such as dimethyl amine the reaction is most conveniently conducted under pressure.

After the compounds have been formed they can be removed by any conventional means such as solvent extraction or filtration. The remaining mother liquor can then be condensed also by any conventional means such as distillation or evaporation, to yield a residual oil. These residual oils form another embodiment of this invention.

Thus another embodiment of this invention is the discovery that the residue remaining after removal of the compounds prepared by the reactions of Equations II and III and subsequent condensation of the mother liquor possess outstanding antioxidant properties. This residue is a red-brown viscous oily material. It is completely soluble in oil and other organic media. It is ashless and hydrolytically stable. Further, it possesses outstanding antioxidant properties.

Thus an embodiment of this invention is the residue remaining after removal of the compounds prepared by the reaction of Equation II and subsequent condensation of the mother liquor; that is, the reaction of a dibenzyl amine with sulfur. The term "dibenzyl amine" is intended to include the morpholino p-cresols of Equation II as well as the amine p-cresols.

Another embodiment of this invention is the residue remaining after removal of the compounds prepared by the reaction of Equation III and subsequent condensation of the mother liquor; that is the reaction of a benzaldehyde, sulfur and an amine or morpholine.

The molar ratio of sulfur to phenolic compounds in both the reactions of Equations II and III can be varied from about 1:1 to about 10:1 or more and still produce a good yield of oily residue.. The yield of compounds of Formula I increases with the molar amount of sulfur used. Thus if it is desired to produce a low yield of compound and a higher yield of oily residue, a molar ratio of about 1:1 should be used. On the other hand, if a higher yield of compound is desired, higher molar ratios should be employed. Thus an embodiment of this invention is the preparation of highly effective antioxidant material by the reaction of Equations II or III wherein the molar ratio of sulfur to phenolic compound is from about 1:1 to about 10:1 or more.

In general, it has been found that increasing the molar ratio of sulfur to phenolic compound beyond that of about 5:1 affords only slightly increased yields of compounds in relation to the amount of sulfur used. Thus, a preferred embodiment of this invention is the preparation of a highly effective antioxidant material by the reaction of Equation II or III wherein the molar ratio of sulfur to phenolic compounds is from about 1:1 to about 5:1.

An excellent yield or compound is obtained with a minimum amount of unreacted phenolic compound when the molar ratio of sulfur to phenolic compounds is about 2:1. Thus a particularly preferred embodiment of this invention is the preparation of a highly effective antioxidant material by the reaction of Equations II or III wherein the molar ratio of sulfur to phenolic compound is about 2:1.

It is to be noted that this invention is not restricted to the use of a molar ratio of sulfur to phenolic compounds of about 1:1 or higher. On the contrary, although the yields of both compound and oily residue are lower when the ratio is below 1:1, both the compounds of Formula I and the residual oil are produced when such a ratio is lower.

The following examples illustrate the compounds of this invention and their preparation according to the method outlined in Equation II.

EXAMPLE 1

In a reaction vessel equipped with a stirrer, temperature measuring means and heating means were placed 40.0 parts by weight of 2,6-di-tert-butyl-$\alpha$-dimethylamino-p-cresol and 10.0 parts by weight of sulfur. The mixture was heated at 140–150° C. for one hour and then allowed to cool to room temperature. The resultant material was then triturated with n-hexane. A light yellow solid material precipitated which was filtered. This material was recrystallized from a 50 percent mixture of isooctane and ethanol, to give 39.0 parts by weight of yellow crystalline 3,5-di-tert-butyl-4-hydroxy-N,N - dimethylthiobenzamide, melting point 163.5–164.5° C.

*Analysis.* — Calculated for $C_{17}H_{27}ONS$: 4.78 percent nitrogen, 10.93 percent sulfur. Found: 4.88 percent nitrogen, 11.0 percent sulfur.

Concentration of the n-hexane mother liquors from the n-hexane trituration yielded 19.1 parts by weight of a red-brown viscous oil. This residual oil is found to have excellent antioxidant properties.

EXAMPLE 2

In a pressure vessel equipped with venting means, heating means, a stirrer and temperature measuring means was placed 653 parts by weight of 2,6-di-tert-butyl-$\alpha$-dimethylamino-p-cresol. The temperature was raised until the amino p-cresol was melted and 80.0 parts by weight of sublimed sulfur was added to the molten amino p-cresol. The pressure vessel was sealed, allowed to cool to approximately 70° C. and pressure tested with nitrogen. After the presure test was completed the nitrogen was vented and the pressure vessel was heated to 140° C. The temperature was maintained between 140–148° C. for 3 hours. Heating was stopped and the mixture was allowed to cook for an additional 3 hours. During the heating period and the subsequent 3 hour cooking, pressure rose to 175 p.s.i. Upon completion of the 3 hour cooking period the pressure vessel was allowed to cool to 70° C. and was vented. The reaction mass was disolved in a 50 percent mixture of toluene and n-hexane. Upon cooling, a crystalline product separated from the toluene-hexane mixture. This was filtered, washed with cold n-hexane and air dried to give 3,5-di-tert-butyl-4-hydroxy-N,N-dimethylthiobenzamide, melting point 162.0–162.5° C.

EXAMPLE 3

In a reaction vessel equipped with heating means, a stirrer and temperature measuring means was placed 74.0 parts by weight of 2-tert-butyl-6-methyl-$\alpha$-dimethylamino-p-cresol and 22.0 parts by weight of sulfur. The mixture was aded at 125–140° C. for 20 minutes, and at 135–145° C. for an additional 10 minutes. The reaction mixture was allowed to cool and was triturated with n-hexane. A solid separated which was filtered, dissolved in a 50 percent mixture of isoctane and ethanol and recrystallized to give a crystalline solid 3-tert-butyl-4-hydroxy-5-methyl-N,N-dimethylthiobenzamide, melting point 167–169° C.

*Analysis.* — Calculated for $C_{14}H_{21}ONS$: 12.73 percent sulfur, 5.57 percent nitrogen. Found: 12.9 percent sulfur, 5.53 percent nitrogen.

EXAMPLE 4

In a reaction vessel equipped with heating means, a stirrer, and temperature measuring means were placed 91.5 parts by weight of 2,6-di-tert-butyl-$\alpha$-morpholino-p-cresol and 19.2 parts by weight of sulfur. The mixture was heated at 140–150° C. for one hour and at 160° C. for an additional 40 minutes. The reaction mixture was allowed to cool and was then dissolved in hot n-hexane. Upon cooling this mixture yielded yellow solids which were filtered, dissolved in a 50 percent mixture of n-hexane and ethanol and recrystallized to give yellow crystalline 2,6-di-tert-butyl-4-[morpholino-(thiocarbonyl)] phenol, melting point 177.5–179.5° C.

*Analysis.*—Calculated for $C_{19}H_{29}O_2NS$: 4.17 percent nitrogen. Found: 4.15 percent nitrogen.

EXAMPLE 5

In a reaction vessel equipped with a stirrer, temperature measuring means and heating means are placed 261 parts by weight of 2-tert-butyl-6-methyl-α-morpholino-p-cresol and 32 parts by weight of sulfur in 500 parts by weight of n-hexyl alcohol. The mixture is heated to 100° C. and kept at that temperature with stirring for one week. During this time a solid precipitates which is then filtered. This material is recrystallized from a 50 percent mixture of isooctane and ethanol to give 2-tert-butyl-6-methyl-4-[morpholino-(thiocarbonyl)]phenol.

The n-hexyl mother liquor is concentrated to yield a residual oil which is found to have excellent antioxidant properties.

Good results are also obtained when other benzyl amines are treated in the manner of the above example. For example, the reaction of 2,6-diethyl-α-N-(1-methyl-n-butyl)-N-phenylamino-p-cresol with sulfur in ethylene glycol mono-n-butyl ether yields 3,5-diethyl-4-hydroxy-N-(1-methyl-n-butyl) - N - phenylthiobenzamide. Concentration of the solvent results in a residual oil which also has antioxidant properties. Likewise 2,6-di-(α,α-methylbenzyl)-α'-morpholino-p-cresol can be reacted with sulfur in n-decyl alcohol to produce 2,6-di-(α,α-methylbenzyl)-4-[morpholino-(thiocarbonyl)]-phenol.

EXAMPLE 6

In a reaction vessel equipped with heating means, a stirrer and temperature measuring means are placed 303 parts by weight of 2,6-di-tert-butyl-α-morpholino-p-cresol and 64 parts by weight of sulfur. The mixture is heated to 130° C. with stirring and maintained at that temperature for 8 hours. After cooling to room temperature the mixture is triturated with n-hexane. A precipitate is formed which is filtered and recrystallized from a 50 percent mixture of isooctane and ethanol to yield 2,6-di-tert-butyl-4-[morpholino-(thiocarbonyl)]-phenol. This compound is found to have excellent antioxidant properties.

Following the procedure in Example 6 good results are also obtained when 2-tert-butyl-6-(1-ethyl-n-decyl)-α-di-tert-butyl-amino-p-cresol is reacted with sulfur to produce 3-tert-butyl-5-(1-ethyl-n-decyl) - 4 - hydroxy-N,N-di-tert-butylthiobenzamide. A residual oil is obtained from this reaction which has excellent antioxidant properties. Likewise 2-n-butyl-6-(1-methyl-n-pentyl) - α - morpholino-p-cresol can be reacted with sulfur to form 2-n-butyl-6-(1-methyl - n - pentyl) - 4 - [morpholino - (thiocarbonyl)]-phenol. The residual oil from this reaction is likewise a good antioxidant.

EXAMPLE 7

In a pressure vessel equipped with venting means, heating means, a stirrer and temperature measuring means are placed 275 parts by weight of 2,6-diisopropyl-α-morpholino-p-cresol and 16 parts by weight of sulfur in 400 parts by weight of capryl alcohol. The pressure vessel is sealed, heated to 160° C. and maintained at that temperature for 2 hours. After cooling to room temperature, the vessel is vented and the mixture filtered. A precipitate is obtained which is recrystallized from a 50 percent mixture of n-hexane and ethanol to yield 2,6-diisopropyl-4-[morpholino-(thiocarbonyl)]-phenol.

The n-capryl alcohol mother liquor is concentrated to yield a residual oil which possesses outstanding antioxidant properties.

The above procedure can be used to obtain good results when reacting 2,6-diethyl-α-morpholino-p-cresol with sulfur. The residual ether produced as a result of this reaction is found to have antioxidant properties as well as the compound itself. Likewise, 2-tert-butyl-6-methyl-α-di-n-eicosylamino-p-cresol can be reacted with sulfur to produce 3-tert-butyl-5-methyl-4-hydroxy - N,N - di-n-eicosyl-thiobenzamide. The residual oil resulting from this reaction is also found to possess good antioxidant properties.

EXAMPLE 8

To a reaction vessel equipped with heating means, a stirrer and temperature measuring means are added 351 parts by weight of 2,6-di-tert-butyl-α-N-n-butyl-N-phenyl-p-cresol and 160 parts by weight of sulfur. The mixture is heated to 220° C. and kept at that temperature with stirring for ½ hour. The mixture is then cooled to room temperature and triturated with n-hexane. A precipitate is formed which is filtered and recrystallized from a 50 percent mixture of n-hexane and ethanol to yield 3,5-di-tert-butyl-4-hydroxy-N-n-butyl-N-phenylthiobenzamide.

The n-hexane mother liquor from the trituration is concentrated to produce a residual oil which has outstanding antioxidant properties.

Good results are also obtained when 2-tert-butyl-6-methyl-α-dimethylamino-p-cresol is reacted with sulfur in the above manner. The residual oil resulting from this reaction is found to possess good antioxidant properties. Likewise, 2,6-di-(α - methylbenzyl) - α' - diethylamino-p-cresol can be reacted with sulfur to produce 3,5-di-(α-methylbenzyl)-4-hydroxy - N,N - diethylthiobenzamide. A residual oil results from this reaction which is found to be an excellent antioxidant.

EXAMPLE 9

In a pressure vessel equipped with venting means, heating means, a stirrer and temperature measuring means are added 662 parts by weight of 2-n-decyl-6-(1,1-dimethyl-n-tetradecyl)-α-N-(α' - methylbenzyl) - N - cyclohexylamino-p-cresol and 256 parts by weight of sulfur. The pressure vessel is sealed, and heated to a temperature of 300° C. for 5 minutes. It is then allowed to cool to room temperature and vented. Upon trituration with n-hexane a solid precipitates from the mixture. This solid is filtered and recrystallized from a 50 percent mixture of n-hexane and ethanol to yield 3-n-decyl-4-hydroxy-5-(1,1-dimethyl-n-tetradecyl)-N-α-methylbenzyl - N - cyclohexylthiobenzamide.

The n-hexane mother liquor from the trituration is concentrated to yield a residual oil which has outstanding antioxidant properties.

Good results are also obtained when other benzylamines are reacted in the above manner. Thus, 2,6-di-n-octyl-α-dibenzylamino-p-cresol can be reacted with sulfur to produce 3,5-di-n-octyl-4-hydroxy - N,N-dibenzylthiobenzamide. The residual oil resulting from this reaction is found to be a good antioxidant. Likewise, 2,6-di-tert-butyl-α-dimethylamino-p-cresol can be reacted with sulfur to produce 3,5-di-tert-butyl-4-hydroxy - N,N - dimethylthiobenzamide. The residual oil produced from this reaction is also found to be a good antioxidant.

EXAMPLE 10

In a reaction vessel equipped with heating means, a stirrer, temperature measuring means and a reflux condenser are placed 477 parts by weight of 2-n-propyl-6-p-n-tridecylbenzyl-α-N-methyl-N-isopropylamino-p-cresol and 320 parts by weight of sulfur. The reaction mixture is refluxed for 2 days, cooled to room temperature and triturated with n-hexane. A solid precipitates which is filtered and recrystallized from a 50 percent mixture of isooctane and ethanol to yield 4-hydroxy-3-n-propyl-5-p-n-tridecylbenzyl-N-methyl-N-isopropylthiobenzamide.

The n-hexane mother liquor from the trituration is concentrated to yield a residual oil with excellent antioxidant properties.

Good results are also obtained when 2-tert-butyl-6-methyl-α-di-n-dodecylamino-p-cresol is reacted with sulfur in the above manner to produce 3-tert-butyl-4-hydroxy-5-methyl-N,N-di-n-dodecylthiobenzamide. A residual oil results from this reaction which is found to have good antioxidant properties.

The following examples illustrate the compounds of this invention and their preparation according to the method outlined in Equation III.

EXAMPLE 11

In a reaction vessel equipped with heating means, a stirrer and temperature measuring means were placed 10.0 parts by weight of 3,5-di-tert-butyl-4-hydroxybenzaldehyde, 3.4 parts by weight of sulfur and 10.0 parts by weight of morpholine. The mixture was refluxed for 3 hours. The reaction mixture was then allowed to cool, dissolved in chloroform, washed in sequence with water, dilute sodium bicarbonate, dilute hydrochloric acid and finally water, dried and evaporated at room temperature to yield white crystalline 2,6-di-tert-butyl-4-[morpholino-(thiocarbonyl)]-phenol which, upon recrystallization from a 50 percent mixture of n-hexane and ethanol, had a melting point of 180–181° C. The mixed melting point of this material with the crystalline product obtained in Example 4 was 179–180° C., establishing the two materials as identical.

EXAMPLE 12

In a reaction vessel equipped with heating means, a stirrer and temperature measuring means are placed 343 parts by weight of 3,5-di-($\alpha,\alpha$-dimethylbenzyl)-4-hydroxybenzaldehyde, 209 parts by weight of N-naphthyl-N-p-methylphenylamine and 32 parts by weight of sulfur in 1000 parts by weight of dioxane. The mixture is heated to 50° C. and maintained at that temperature for one week. The solvent is removed under reduced pressure and the resulting residue is taken up in a 50 percent mixture of hot ethanol and isooctane, filtered and cooled to yield 3,5 - di - ($\alpha,\alpha$ - dimethylbenzyl)-4-hydroxy-N-naphthyl-N-p-methylphenylthiobenzamide.

The dioxane mother liquor is concentrated to yield a residual oil which is found to be an excellent antioxidant.

Good results are also obtained when other benzaldehydes are reacted with other amines and sulfur in a similar manner. Thus 3,5-diisopropyl-4-hydroxybenzaldehyde can be reacted with N,N-dimethylamine and sulfur in laurel alcohol to produce 3,5-diisopropyl-4-hydroxy-N,N-dimethylthiobenzamide. The residual oil resulting from this reaction is found to have good antioxidant properties. Likewise 3,5-diisopropyl-4-hydroxybenzaldehyde can be reacted with N-n-hexyl-N-p-n-nonylphenylamine and sulfur in benzyl alcohol to produce 4-hydroxy-3,5-diisopropyl-N-n-hexyl-N-p-n-nonylphenylbenzamide. The residual oil produced by this reaction is also found to have excellent antioxidant properties. Also 3,5-di-tert-butyl-4-hydroxybenzaldehyde can be reacted with N,N-dimethylamine and sulfur in cetyl alcohol to produce 3,5-di-tert-butyl-4-hydroxy-N,N-dimethylthiobenzamide. A residual oil is also produced from this reaction which has outstanding antioxidant properties.

EXAMPLE 13

In a reaction vessel equipped with heating means, a stirrer and temperature measuring means are placed 241 parts by weight of 3,5-di-n-eicosyl-4-hydroxybenzaldehyde, 101 parts by weight of N,N-di-n-propylamine and 64 parts by weight of sulfur in 500 parts by weight of pyridine. The mixture is heated to 80° C. and maintained at that temperature for 3 hours. After cooling to room temperature the mixture is triturated with n-hexane. A solid is precipitated which is filtered and recrystallized from a 50 percent mixture of n-hexane and ethanol to yield 3,5-di-n-eicosyl-4-hydroxy-N,N-di-n-propylthiobenzamide.

The pyridine mother liquor is concentrated to yield a residual oil which has excellent antioxidant properties.

Further, good results are obtained when 3,5-di-tert-butyl-4-hydroxybenzaldehyde is reacted with N,N-di-n-octylamine and sulfur in stearyl alcohol. This reaction also produces a residual oil which has excellent antioxidant properties. Likewise, 3-n-butyl-4-hydroxy-5-(1-methyl-n-pentyl)-benzaldehyde can be reacted with N-(1,1-dimethyl-n-pentyl) - N - (1,1-dimethyl-n-tridecyl)-amine and sulfur in ethylene glycol monobenzylether to yield 3-n-butyl-4-hydroxy-5-(1-methyl-n-pentyl)-N-(1,1-dimethyl-n-pentyl) - N - (1,1-dimethyl-n-tridecyl)-thiobenzamide. This reaction also yields a residual oil which has excellent antioxidant properties.

EXAMPLE 14

In a pressure vessel equipped with venting means, heating means, a stirrer and temperature measuring means are placed 482 parts by weight of 3,5-di-n-eicosyl-4-hydroxybenzaldehyde, 174 parts by weight of morpholine and 32 parts by weight of sulfur in 1000 parts by weight of mesityl alcohol. The pressure vessel is sealed, heated to 100° C. and kept at that temperature for one hour. It is then cooled to room temperature and vented. A precipitate is formed which is filtered and recrystallized from a 50 percent mixture of isooctane and ethanol to yield 2,6-di-n-eicosyl - 4 - [morpholino-(thiocarbonyl)]-phenol.

The mesityl alcohol mother liquor is concentrated to produce a residue which has excellent antioxidant properties.

The above procedure can be used to produce other excellent antioxidant compounds and antioxidant residual oils. Thus, 3-benzyl-5-sec-butyl-4-hydroxybenzaldehyde can be reacted with N-n-butyl-N-(1-methyl-n-decyl)-amine and sulfur in n-nonyl alcohol to produce 3-benzyl-5-sec-butyl-4-hydroxy-N-n-butyl - N - (1-methyl-n-decyl)-thiobenzamide. The residual oil produced from this reaction is an excellent antioxidant. Likewise, 3,5-di-tert-butyl-4-hydroxybenzaldehyde can be reacted with di-n-octyldecylamine and sulfur in ethylene glycol monophenyl ether to produce 3,5-di-tert-butyl-4-hydroxy-N,N-di-n-octyldecylthiobenzamide. The residual oil resulting from this reaction is also a good antioxidant.

EXAMPLE 15

In a reaction vessel equipped with a stirrer, heating means and temperature measuring means are placed 191 parts by weight of 3-tert-butyl-4-hydroxy-5-methylbenzaldehyde, 600 parts by weight of di-n-tridecylamine and 160 parts by weight of sulfur. The reaction mixture is heated to 135° C. and kept at that temperature for ½ hour. During this time a solid precipitates which is filtered and recrystallized from a 50 percent mixture of n-hexane and ethanol to yield 3-tert-butyl-4-hydroxy-5-methyl-N,N-di-n-tridecylthiobenzamide.

The amine mother liquor from the above reaction can be concentrated to yield a residual oil which has outstanding antioxidant properties.

Further, good results are also obtained in following the above procedure when reacting 3-methyl-5-tert-octyl-4-hydroxybenzaldehyde with sulfur in a molar excess of morpholine to produce 2-methyl-6-tert-octyl-4-[morpholino-(thiocarbonyl)]-phenol. This reaction also produces a residual oil which has good antioxidant properties.

EXAMPLE 16

In a pressure vessel equipped with venting means, heating means, a stirrer and temperature measuring means are placed 261 parts by weight of 4-hydroxy-3,5-di-n-pentylbenzaldehyde, 153 parts by weight of dicyclopentylamine and 256 parts by weight of sulfur. The pressure vessel is sealed and heated to 300° C. for 5 minutes after which it is allowed to cool and then vented. The mixture is then triturated with n-hexane. A solid precipitates which is filtered and recrystallized from a 50 percent mixture of n-hexane and ethanol to yield 4-hydroxy-3,5-di-n-pentyl-N,N-dicyclopentylthiobenzamide.

The n-hexane mother liquor from the trituration is condensed to yield a residual oil which is found to have good antioxidant properties. Good results are also obtained when the above procedure is followed in reacting 3,5-diisopropyl-4-hydroxybenzaldehyde with di-n-tetradecylamine and sulfur to yield 3,5-diisopropyl-4-hydroxy-N,N-di-n-tetradecylthiobenzamide. A residual oil results from this reaction which has good antioxidant properties.

EAMPLE 17

In a reaction vessel equiped with heating means, a stirer, temperature measuring means and a reflux condenser are placed 261 parts by weight of 3,5-diisopropyl-4-hydroxybenzaldehyde, 113 parts by weight of di-n-hexadecylamine and 320 parts by weight of sulfur. The mixture is refluxed for 3 days. It is then cooled and triturated with n-hexane. A solid precipitates which is filtered and recrystallized from a 50 percent mixture of isooctane and ethanol to yield 3,5-diisopropyl-4-hyroxy-N,N-di-n-hexadecylthiobenzamide.

The n-hexane mother liquor from the trituration can be condensed to yield a residual oil which has excellent antioxidant properties.

Good results are also obtained when other benzaldehydes are reacted with other amines and sulfur. Thus, 4-hydroxy-3-methyl-5-tert-octylbenzaldehyde can be reacted with di-n-nonylamine and sulfur to produce 4-hydroxy - 3 - methyl - 5 - tert - octyl-N,N-di-n-nonylthiobenzamide. This reaction also yields a residual oil which has excellent antioxidant properties.

The products of this invention are outstanding antioxidants. Therefore, an embodiment of this invention is a new composition of matter which comprises organic material normally tending to undergo oxidative deterioration in the presence of air, oxygen or ozone containing an appropriate quantity—from 0.001 up to about 5 percent, and preferably from about 0.10 to about 2 percent— of a product of this invention. The term "product" is meant to include the compounds of Formula I and also the residual oil produced by the reactions of Equations II or III.

The products of this invention find important utility as antioxidants in a wide variety of oxygen-sensitive material. Thus liquid hydrocarbon fuels such as gasoline, kerosene and fuel oil are found to possess increased storage stability by the use of a product of this invention. Likewise, liquid hydrocarbon fuels such as gasoline which contain organometallic additives such as tetraethyllead as well as other organometallic compounds which are used as fuel additives attain appreciably increased oxidative stability by the practice of this invention. In addition, lubricant oils and functional fluids, both those derived from naturally occurring hydrocarbons and those synthetically prepared are greatly enhanced by the practice of this invention. The addition of small quantities of the products of this invention to such materials as turbine, hydraulic, transformer and other highly refined industrial oils, soaps and greases; plastics; synthetic polymers such as polyethylene and polypropylene; organometallic compositions where such fluids contain tetraethyllead and tetraethyllead antiknock mixtures as well as other organometallics; elastomers, including natural rubber; lubricating greases; crankcase lubricating oils; and the like, greatly increase resistance to deterioration in the presence of air, oxygen or ozone.

The products of this invention are also very useful in protecting petroleum wax—paraffin wax and microcrystalline wax—against oxidative deterioration. They also find use in the stabilization of edible fats and oils of animal and vegetable origin which tend to become rancid, especially during long periods of storage because of oxidative deterioration. Typical representatives of these edible fats and oils are linseed oil, cod liver oil, castor oil, soy bean oil, rape seed oil, coconut oil, olive oil, palm oil, corn oil, sesame oil, peanut oil, babassu oil, butter fat, lard beef tallow, and the like.

The products of this invention are also useful in preventing oxidative deterioration in lubricating oil compositions. Thus, an embodiment of this invention is a lubricating oil normally susceptible to oxidative deterioration and a small antioxidant quantity, up to 5 percent, of a product of this invention as defined above.

To prepare the lubricants of this invention an appropriate quantity—from about 0.001 to about 5 percent and preferably from about 0.10 to about 2 percent— of a compound of this invention is blended with the base oil to be protected. Suitable base oils include mineral oils and also synthetic diester oils such as sebacates, adipates, etc., which find particular use as aircraft instrument oils, hydraulic and damping fluids and precision bearing lubricants. All of these base oils are normally susceptible to oxidative deterioration, especially at elevated temperatures. The finished lubricants of this invention have much greater oxidation stability and many other improved performance characteristics as compared with the corresponding base oils.

To illustrate the unparalleled benefits obtained by the use of the products of this invention as antioxidants, standard oil oxidation tests were employed. The equipment and test procedure described by Kroger et al., Erdol and Kohle, 2, p. 398 (1949) served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at the selected temperature for the test until the substrate oil undergoes catastrophic oxidation which is shown by a rapid oxygen uptake. In all cases, the test oil is deliberately contaminated with iron hexoate as an oxidation promoter. In tests of this nature, the oxidation stability of a test lubricant is determined by measuring its induction period, that is, the time required for catastrophic deterioration under the above outlined conditions. the longer the induction period, the more stable the lubricant. In the oil tested the induction period was 3 minutes when the oil contained no additive. However, when $1.0 \times 10^{-2}$ moles per liter of representative products of this invention were added to the oil, the induction period was, in several instances, raised as much as approximately 3 orders of magnitude. The actual tests results and compounds employed are shown in the following Table I.

TABLE I.—INDUCTION TESTS OF A LUBRICATING OIL CONTAINING VARIOUS PRODUCTS OF THIS INVENTION

| Ex. No. | Additive | Concentration | | Induction period (minutes) |
|---|---|---|---|---|
| | | Mole/Liter $\times 10^2$ | Weight percent | |
| 1 | None | | | 3 |
| 2 | 3,5-di-tert-butyl-4-hydroxy-N,N-dimethyl-thiobenzamide | 1.0 | | 2,794 |
| 3 | 3-tert-butyl-4-hydroxy-5-menthyl-N,N-dimenthylthiobenzanide | 10 | | 2,713 |
| 4 | 2,6-di-tert-butyl-4-[morpholino(thiocarbonyl)]-phenol | 1.0 | | 1,815 |

As seen from the above table, all the products tested gave a spectacular increase in the induction time of the oil. Ordinarily, antioxidants of the phenolic and amine type known to the art give induction periods in this test of between about 10 and 300 minutes. Thus the results obtained with the products of this invention become even more spectacular when compared to results obtainable with other known antioxidants.

To further illustrate the useful antioxidant properties of the novel products of this invention, polyveriform oxidation stability tests were conducted. The polyveriform oxidation test is described in the paper entitled "Factors Causing Lubricating Oil Deterioration in Engines," Ind. and Eng. Chem., Anal. Ed. 17, 302 (1945). See also "A Bearing Corrosion Test for Lubricating Oils and Its Correlation with Engine Performance," Anal. Chem., 21, 737 (1949). This test effectively evaluates the performance of lubricating oil antioxidants. The test equipment procedure employed and correlations of the results with engine performance are discussed in the first paper above cited. By employing various products of this invention in oxygen-sensitive lubricating oil, effective inhibition of oxidative deterioration is achieved.

The comparative tests were conducted using the method and apparatus essentially as described in the publication first above mentioned. One minor modification was that the steel sleeve and copper test piece described in this publication were omitted from the apparatus. In these tests an intially additive-free, 95 V.I. solvent-refined SAE 10 crankcase oil was used. The principal conditions consisted of passing 48 liters of air per hour through the test oil for a total period of 20 hours while maintaining the oil at a temperature of 300° F. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of oil employed. Lubricating oils were prepared by blending small amounts of typical compounds of this invention with individual portions of the above lubrication oil. These compositions were then subjected to the above stringent oxidation test. The results of these tests are shown in Table II.

To illustrate the useful antioxidant properties of the novel residual oils of this invention tests were conducted similar to the polyveriform oxidation stability test described above. The essential differences are that instead of using ferric-2-ethyl hexoate as an oxidation catalyst, 0.10 percent lead bromide is used. In addition, a copper-lead bearing is submerged in the oil as an additional catalyst. Further, the oil used is an initially additive-free 105.5 V.I. sulfur-refined, SAE 20 crankcase oil. The duration of the test is 120 hours, at the end of which the loss in weight of the copper lead bearing is determined. When no loss in weight has occurred a small increase in weight is generally observed. This increase in weight is generally within the experimental error of the test. It can also be attributed to the formation of a slight amount of varnish which is expected from the harsh conditions of the test. Such a determination gives good correlation with actual engine tests. The acid number and viscosity of the oil are also measured. It should be noted that this test is harsher than the previously described polyveriform test. Consequently, the acid number and viscosity measurements will be higher. The results of this test are shown in Table III. The oils tested were all residual oils resulting from the reaction of 4-hydroxy-3,5-di-tert-butylbenzyldimethylamine with sulfur. The reaction temperatures and ratios of sulfur to phenol are given in the table.

TABLE III.—EFFECT OF PRODUCTS OF THIS INVENTION ON A COPPER-LEAD BEARING IN LUBRICATING OIL (0.5 WEIGHT PERCENT EFFECTIVE COMPONENT)

| Example No. | Additive | Reaction conditions | | | Bearing weight loss, mg. | Acid No. | Viscosity increase |
|---|---|---|---|---|---|---|---|
| | | Sulfur: phenol ratio | Temp. (° C.) | Time (hrs.) | | | |
| 8 | None | | | | 354 | 13.9 | 970 |
| 9 | Residual Oil—1 | 1.0 | 150 | 2 | +5 | 3.5 | 36 |
| | Residual Oil—1 | 1.0 | 150 | 2 | +4 | 4.4 | 40 |
| | Residual Oil—2 | 1.0 | 210 | ½ | +8 | 5.4 | 50 |
| | Residual Oil—2 | 1.0 | 210 | ½ | +1 | 6.0 | 57 |
| | Residual Oil—3 | 2.0 | 150 | 2 | +7 | 2.8 | 35 |
| | Residual Oil—3 | 2.0 | 150 | 2 | +4 | 3.0 | 36 |

TABLE II.—EFFECT OF PRODUCTS OF THIS INVENTION ON THE OXIDATION OF LUBRICATING OIL

| Ex. No. | Additive | Additive Conc., percent by weight | Acid No. | Viscosity increase at 100° F., percent |
|---|---|---|---|---|
| 5 | None | | 6.9 | 97 |
| | 3,5-di-tert-butyl-4-hydroxy-N,N-dimethyl-thiobenzamide | 1.0 | 0.6 | 0 |
| 6 | None | | 5.5 | 100 |
| | 3,5-di-tert-butyl-4-hydroxy-N,N-dimethyl-thiobenzamide | 1.0 | 0.8 | 0 |
| | 3-tert-butyl-4-hydroxy-5-methyl-N,N-dimethyl-thiobenzamide | 1.0 | 2.1 | 9 |
| 7 | None | | 5.5 | 96 |
| | 2,6-di-tert-butyl-4-[morpholino(thiocarbonyl)]-phenol | 1.0 | 1.8 | 0 |

By referring to the data presented in Table II, it is immediately apparent that the products of this invention effectively inhibit oxidative deterioration of lubricating oil. In fact, essentially complete stabilization is obtained with the preferred product of this invention 3,5-di-tert-butyl-4-hydroxy-N,N-dimethylthiobenzamide, whereas, typical prior known phenolic and sulfur-containing anti-oxidants which are considered effective antioxidants show results in the polyveriform tests indicating acid number increases of up to about 4.0 and viscosity increases in the order of 50 percent. Thus, stabilization such as achieved with the products of this invention has not been possible with previously known antioxidants which have been considered acceptable in actual commercial practice.

The results of the above table are truly astounding. No other prior phenolic or sulfur-containing antioxidant, including the best commercial antioxidants, tested as above, even approached the excellent results obtained with these residual oils. No bearing loss was detected with any of the residual oils of this invention. The slight increase in weight as explained above can be attributed to the normal experimental era or the presence of a slight amount of varnish prevalent in tests of this nature. In contrast, other additives similarly tested show a bearing loss as high as 1200 mg.

The following examples illustrate the preferred lubricating oil compositions of this invention.

Example 18

To 1,000 parts of a solvent refined neutral oil 95 V.I. and 200 SUS at 100° F. containing 6 percent of a commercial methacrylate Type VI approver which gives the finished formulation of a V.I. of 140 and a viscosity of 300 SUS at 100° F. is added 5 percent of 3,5-di-tert-butyl-4-hydroxy-N,N-dimethylthiobenzamide.

Example 19

To an additive-free solvent refined crankcase-lubricating oil having a viscosity index of 95 and an SAE viscosity of 10 is added 0.001 percent of 2,6-di-tert-butyl-4-[morpholino-(thiocarbonyl)]-phenol.

Example 20

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of 3,5-diethyl-4 - hydroxy - N - (1 - methyl - n - butyl) - N - phenylthiobenzamide. The resulting oil possesses greatly enhanced resistance to oxidative deterioration.

Example 21

To 100,000 parts of a commercially available pentaerythritol ester having a viscosity at 100° F. of 22.4 centistokes, and known in the trade as "Hercoflex 600" is added 400 parts (0.4 percent) of residual oil No. 1 in Table III. The resulting finished oil possesses markedly improved resistance against oxidative deterioration.

Example 22

To 100,000 parts of dioctyl sebacate having a viscosity of 210° F. of 36.7 SUS, a viscosity index of 159 and a molecular weight of 426.7 is added 250 parts (0.25 percent) of 2 - tert - butyl - 6 - methyl - 4 - [morpholino-(thiocarbonyl)]-phenol.

The products of this invention are also useful as additives to functional fluids and automatic transmission fluids. The primary constituent of a functional fluid is a refined mineral lubricating oil having a carefully selected minimum viscosity of 49 Saybolt Universal Seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts or phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together, while heating the oil to a temperature up to 200° F.

Example 23

A fluid of this invention is prepared by blending 80 parts of a conventionally-refined Pennsylvania mineral oil (99 SUS at 100° F.), 2 parts of 3-tert-butyl-4-hydroxy-5-methyl-N,N-dimethylthiobenzamide, 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

Example 24

Another such fluid consists of 95 parts of a solvent refined, light acid-treated, clay-contacted, solvent dewaxed paraffin base distillate mineral oil (110 SUS at 100° F.); 0.1 part of 2,6-diethyl-4-[morpholino-(thiocarbonyl)]-phenol; 0.1 part of calcium octylphenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity of 60/60° F. of 0.875.

Liquid hydrocarbon fuels employed in the operation of spark ignition combustion engines are also vastly improved in their storage stability by the practice of this invention. Table I, below, gives the compositions of a number of typical commercial gasolines which may be stabilized against oxidative deterioration by the inclusion therein of a product of this invention.

TABLE I.—GASOLINE COMPOSITIONS

| Gasoline | Percent Aromatics | Percent Olefins | Percent Saturates | Gravity, ° API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

EXAMPLE 25

To 1,000 parts of Gasoline A, as described in Table I, is added 10 parts of 3,5-di-tert-butyl-4-hydroxy-N,N-dimethylthiobenzamide.

EXAMPLE 26

To 10,000 parts of Gasoline B is added 50 parts of 3,5-di-tert-butyl-4-hydroxy-N,N-di-n-octylthiobenzamide.

EXAMPLE 27

To 500 parts of Gasoline C, as described in Table I, is added 10 parts of 3-benzyl-5-sec-butyl-4-hydroxy-N,n-butyl-N-(1-methyl-n-decyl)thiobenzamide.

EXAMPLE 28

To 2,000 parts of Gasoline D is added 15 parts of 2-n-butyl - 6 - (1-methyl-n-pentyl)-4-[morpholino-(thiocarbonyl)]-phenol.

EXAMPLE 29

To 10,000 parts of Gasoline E is added 500 parts of residual oil No. 2 in Table III.

Antiknock compositions and spark ignition internal combustion engine fuels containing mixtures of organolead antiknock agents and cyclopentadienyl manganese tricarbonyls are also vastly improved in their storage stability by the practice of this invention. Such compositions are described more fully in U.S. Patent No. 2,818,417.

Despite their great general stability cyclopentadienyl manganese tricarbonyls accelerate and in some cases cause deterioration of leaded gasolines containing them. Research has shown that cyclopentadienyl manganese tricarbonyls serve as deterioration catalysts but the manner by which they exert this adverse effect cannot presently be explained. All available evidence indicates that the manganese compounds catalyze the simultaneous deterioration of the organolead antiknock agent and the base fuel. This results in the premature formation of organolead decomposition products (both soluble and insoluble) and gum and other sludges resulting primarily from the fuel deterioration. In addition, the amounts of these decomposition products are ultimately increased. Hence, the problem is a combination of increased rate of deterioration and increased extent of deterioration.

The problem is not merely the conventional one of providing protection against the oxidative deterioration of clear gasolines or of leaded gasolines. For instance, a number of powerfully effective antioxidants of proven ability to stabilize clear and leaded gasolines have been found to fail completely when used in an attempt to overcome this problem. In fact, after much research it has been found that prior concepts of gasoline and gasoline additive stabilization are of no help whatsoever in seeking to find a solution to this complex problem.

As a further illustration of the unique character of this problem, it has been found that a widely used metal deactivator—N,N' - disalicylidene-1,2-diaminopropane— affords no relief whatsoever from the present problem. In fact, the metal deactivator actually further increases the amount of deterioration that occurs in manganese-containing leaded gasolines. Hence the present problem is not a simple type of metal catalyzed oxidative deterioration that can be remedied by conventional means, such as by complexing metallic fragments (produced by initial decomposition of the metallic additives) by means of a metal deactivator. It is seen that the present problem is the result of a highly complex interplay among the various ingredients (and perhaps their decomposition products) of these commercially important organolead manganese compositions.

Leaded gasolines containing a minor amount of a cyclopentadienyl manganese tricarbonyl or cyclopentadienyl nickel nitrosyl can be effectively stabilized by the presence therein of a small quantity of a compound of this invention, such as 3,5-di-tert-butyl-4-hydroxy-N,N-dimethylthiobenzamide. These compounds have been found to completely eliminate the problem at hand. In fact, in many cases, the compositions of this invention have stabilities at least as great as those of the corresponding manganese and nickel-free leaded gasolines.

In the compositions of this invention the concentrations of the prime ingredients will vary. Thus the finished fuels of this invention can contain from about 0.2 to about 6.4 grams of lead per gallon as an organolead antiknock agent. The manganese or nickel concentrations therein can range from about 0.005 to about 6 grams per gallon as a cyclopentadienyl manganese tricarbonyl or cyclopentadienyl nickel nitrosyl respectively. On a cost effectiveness basis, finished motor fuels containing per gallon from about 1 to about 4 grams of lead and from 0.05 to about 2 grams of manganese or nickel are preferred. In all of these finished fuels the concentration of the above compounds of this invention can be from about 0.0002 to about 0.01 weight percent based on the fuel. Expressed in different units these concentrations correspond respectively to about 0.5 to about 25 pounds per thousand barrels of fuel. These concentrations are sufficient to inhibit the deterioration which would occur in the absence of the compounds of this invention.

In formulating finished fuels it is common practice to employ concentrated gasoline solutions of the additives. These stock solutions are then cut with or metered into the remainder of the gasoline to achieve the appropriate concentration in the finished fuel. A feature of this invention is that such concentrated stock solutions are likewise very effectively stabilized by the presence therein of the above compounds of this invention. Consequently, the concentrations of the above ingredients can be as much as 10 times as high as those set forth above. The choice of concentrations is within the discretion of the refiner and takes into consideration the quantities of gasoline being processed, the storage temperatures to be accounted, the length of storage involved, etc. The specific concentrations given above are for illustrative purposes only and are not to be considered as limitations upon this invention.

Another embodiment of this invention is an antiknock fluid composition adopted for use as an additive to gasoline, which composition consists essentially of an organolead antiknock agent, a cyclopentadienyl manganese tricarbonyl or cyclopentadienyl nickel nitrosyl and a compound of this invention as defined above, there being present in the composition from about 0.00078 to about 30 parts by weight of manganese or nickel per part of lead and from about 0.1 to about 5 weight percent of the compounds of this invention based on the weight of the organolead antiknock agent. These compositions possess greater stability by virtue of the presence therein of a compound of this invention. Furthermore, these compositions provide an excellent vehicle by which the finished fuels of this invention can be formulated.

The foregoing compositions of this invention can also contain other additives known in the art. Halogen scavengers for the organolead antiknock agents (ethylene dibromide and/or ethylene dichloride, etc.), corrective agents (phosphorus, arsenic and antimony compounds, etc.), dyes, solvents and/or diluents are illustrative of the types of additives which can be co-present.

To demonstrate the striking improvement resulting from this invention, storage tests are conducted, a number of fuel blends are made up using two commercially available gasolines of widely differeing stabilities. Each of these base fuels are treated with tetraethyllead so that the concentration thereof is 3 ml. per gallon (3.18 gram of lead per gallon). The tetraethyllead is used in the form of commerical motor mix (tetraethyllead, 0.5 theory of ethylene dibromide and 1.0 theory of ethylene dichloride). To portions of each of these fuels is then added methylcyclopentadienyl manganese tricarbonyl to a concentration of 0.5 gram of manganese per gallon. Samples of these manganese-containing lead fuels are then treated per this invention with residual oil No. 3 in Table III, a product of this invention. Concentrations equivalent to six pounds per one thousand barrels are used. For comparative purposes, identical samples are made up containing six pounds per one thousand barrels of a commercial antioxidant of proven ability and widely used to stabilize gasolines both clear and leaded. This additive is referred to below as "commercial additive."

The various test fuels are stored at 110° F. and periodically analyzed to determine their content of gum and soluble alkyl lead salts. The gum content is determined by the standard ASTM tests procedure D–381. The soluble alkyl lead salts are determined by extracting samples of the stored fuels with an ammonia ammonium acetate solution and assaying the amount of lead so extracted. The formation of gum and soluble alkyl lead salts is, of course, proof that decomposition of the fuel has taken place. Therefore, the relative stabilities of the test fuels are directly measured by determining the length of time required to form 7 mg. of gum per 100 ml. of fuel and 3 mg. of lead as soluble alkyl lead salts per 100 ml. of fuel. The longer the time required to form these amounts of decomposition products the more stable is the fuel compositions. In this test, fuels of this invention are stable for a substantially longer time than are fuels not containing a product of this invention.

The following examples illustrate the compositions of this invention and the methods by which they are prepared.

EXAMPLE 30

To 1000 gallons of a commercial gasoline having a gravity of 59.0° API, an initial boiling point of 98° F. and a final boiling point of 390° F. are added 3.18 grams per gallon of lead as tetraethyllead, 0.6 theory (based on the lead) of bromine as ethylene dibromide, 1.0 theory (based on the lead) of chlorine as ethylene dichloride, 0.25 gram of manganese per gallon as methylcyclopentadienyl manganese tricarbonyl and 0.0002 weight percent (based on the gasoline) of 2,6-di-($\alpha,\alpha$-methylbenzyl-4-[morpholino(thiocarbonyl)]-phenol. The resultant fuel possesses enhanced stability characteristics.

EXAMPLE 31

With a gasoline having an initial boiling point of 93° F., a final boiling point of 378° F., an API gravity of 56.2° and a tetraethyllead content equivalent to 0.2 gram of lead per gallon are blended cyclopentadienyl nickel nitrosyl to a concentration of 0.05 gram of nickel per gallon and 3,5-di-tert-butyl-4-hydroxy-N,N-di-n-octadecylthiobenzamide to a concentration of 0.005 weight percent (based on the gasoline). The finished fuel so formed possesses improved stability properties.

EXAMPLE 32

To a gasoline having an API gravity of 51.5° F., an initial boiling point of 91° F. and a final boiling point of 394° F. are blended 6.4 grams of lead per gallon as tetrabutyllead, 2 grams of manganese per gallon as octylcyclopentadienyl manganese tricarbonyl and 0.0008 weight percent (based on the gasoline) of 3-tert-butyl-5-(1 - ethyl - n - decyl) - 4 - hydroxy - N,N - di - tert - butyl-thiobenzamide. The resultant fuel possesses very good stability.

EXAMPLE 33

With a gasoline having an initial boiling point of 93° F. and a final boiling point of 410° F. are blended 2 grams of lead per gallon as tetraphenyllead, 6 grams of nickel as diethylcyclopentadienyl nickel nitrosyl, 1 theory (based on the lead) of bromine as ethylene debromide and 0.01 weight percent (based on the gasoline) of 2-methyl-6-tert-octyl-4-[morpholino-(thiocarbonyl)]-phenol. The finished fuel has very good storage stability.

This invention also extends to the use in the above compositions of manganese pentacarbonyl (i.e., dimanganese decacarbonyl).

The products of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus a preferred embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR–S) and butadiene-acrylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

EXAMPLE 34

To illustrate the enhanced oxygen resistance of the rubber compositions of this invention and their excellent non-staining and non-discoloration characteristics, a light-colored stock is selected for test. This stock has the following composition:

|  | Parts by wt. |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
|  | 181.12 |

To the above base formula is added one part by weight of 3,5 - di - tert-butyl-4-hydroxy-N,N-dimethylthiobenzamide and individual samples are cured for 20, 30, 45 and 60 minutes at 274° C. using perfectly clean molds with no mold lubricant. Another set of samples of the same base formula which do not contain an antioxidant are cured under the same conditions.

EXAMPLE 35

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of the residual oil produced from the reaction of 3-n-butyl-4-hydroxy-5-(1-methyl-n-pentyl)-benzaldehyde with N-(1,1-dimethyl-n-pentyl)-N-(1,1-dimethyl-n-tridecyl)amine and sulfur. This batch is then cured for 60 minutes at 45 p.s.i. of steam pressure.

EXAMPLE 36

Natural rubber stock is compounded according to the following formula:

|  | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 3-tert-butyl-5-methyl-4-hydroxy-N,N-di-n-eicosylthiobenzamide | 1 |
| Benzothiazyl disulfide | 0.4 |
| Amine activator | 0.5 |

This stock is then vulcanized for 60 minutes at 280° F.

EXAMPLE 37

A butadiene-acrylonitrile copolymer is produced from butadiene-1,3 and 32 percent of acrylonitrile. Two percent (based on the dry weight of the copolymer) of 3,5-di - α-methylbenzyl-4-hydroxy-N,N-diethylthiobenzamide is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.1 to about 3 percent by weight give uniformly satisfactory results.

Other rubbers and elastomers which can be prepared according to this invention are the rubbery polymerizates of isoprene, butadiene-1,3 piperylene; also the rubbery copolymer of conjugated dienes with one or more polymerizable monoolefinic compounds which have the capability of forming rubbery copolymers with butadiene-1,3, outstanding examples of such monoolefinic compounds being those having the group $CH_2=C<$, exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl substituted vinyl pyridines, etc. In fact, excellent stabilization is achieved by incorporating a compound of this invention in any of the well known elastomers which are normally susceptible to deterioration in the presence of air, such as elastoprenes, elastolenes, elastothiomers, and elastoplastics.

As pointed out above, the products of this invention are effective antioxidants when added to other organic compositions normally tending to undergo deterioration in the presence of air, oxygen or ozone. Thus saturated hydrocarbon synthetic polymers are greatly enhanced by the practice of this invention.

The saturated hydrocarbon synthetic polymers which are greatly enhanced in oxidative stability by the practice of this invention, include polymers obtained from the polymerization of a hydrocarbon monoolefin having up to 4 carbon atoms.

Examples of each monomers include ethylene, propylene, butylene and isobutylene. Thus the polymers are homopolymers and copolymers of ethylene, propylene, butylene and isobutylene.

A preferred embodiment of this invention is polyethylene containing a small antioxidant quantity, up to about 5 percent, of a product of this invention. A particularly preferred embodiment of the invention comprises polyethylene containing from about 0.01 to about 2 percent of a product of this invention. In particular it is found that when from 0.01 to about 2 percent of 3,5-di-tert-butyl-4-hydroxy-N,N-dimethylthiobenzamide is incorporated in polyethylene compositions of outstanding oxidative stability result. This is true, in particular for 3,5-di-tert-butyl-4-hydroxy-N,N-dimethylthiobenzamide. Thus 3,5-di-tert-butyl-4-hydroxy-N,N-dimethylthiobenzamide represents an especially preferred inhibitor of this invention.

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 to 1,000 atmospheres at temperatures between 150 and 275° C. Or, if desired, they may be similar or identical to the essentially linear and unbranched polymers ordinarily having greater molecular weights which may be obtained under relatively low pressures of 1 to 100 atmospheres using such catalysts to polymerize the ethylene as mixtures of strong reducing agents and compounds of Group IV-B, V-B and VI-B metals of the Periodic System; chromium oxide and silicated alumina; hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

The benefits derived from the practice of this invention are demonstrated by comparative oxidation tests of uninhibited polyethylene and polyethylene containing an antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproductible size. The vessel is then inserted into a chamber which may be sealed and which is connected to a capillary tube leading to a gas buret and leveling bulb. The apparatus is flushed with oxygen at room temperature, sealed, and the temperature is raised to 150° C. The oxygen pressure is maintained at 1 atmosphere by means of a leveling bulb. The oxygen uptake at the elevated temperature is recorded until sharp increase in the oxygen uptake occurs. This procedure has been adopted since it has been found that many compounds may inhibit the oxidation for a certain induction period after which time a very sharp increase in the rate of oxygen uptake occurs indicating that the antioxidant has been exhausted. In tests of this nature it is found that the compositions of this invention have greatly increased the "induction periods."

There are several methods available for preparing the inhibited hydrocarbon polymer compositions of this invention. Thus, the blending of the products of this invention with a polymer such as, for example, polyethylene, may be carried out on open rolls, on internal mixers or may be accomplished by mixing with extrusion. It is also possible to prepare concentrated batches of the polymer containing excessive amounts of the products of this invention and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The products of this invention may be initially mixed with the polymer in the dried state or it may be first dissolved in a suitable solvent, then sprayed on the polymer and milled in.

Examples of the hydrocarbon polymer compositions of this invention prepared as described above follow. All parts and percentages are by weight in these examples.

EXAMPLE 38

To 1000 parts of polyethylene produced by oxygen catalyzed reaction under a pressure of 20,000 atmospheres and having an average molecular weight of 40,000 is added and mixed 2 parts of 2,6-diisopropyl-4-[morpholino-(thiocarbonyl)]-phenol. The resulting composition has greatly increased oxidative stability.

EXAMPLE 39

With 200 parts of polyisobutylene having an average molecular weight of 100,000 is blended 1.0 part 4-hydroxy - 3 - methyl - 5 - tert - octyl - N,N - di - n - nonylthiobenzamide.

EXAMPLE 40

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 3,5-di-tert-butyl-4-hydroxy-N-n-butyl-N-phenylthiobenzamide.

EXAMPLE 41

A linear polyethylene having a high degree of crystallinity (about 93 percent) and below 1 ethyl branched chain per hundred carbon atoms, a density of about 0.96 gram per milliliter and which has about 1.5 double bonds per 100 carbon atoms is treated with $50 \times 10^{-8}$ roentgens of $\beta$-radiation. To the thus irradiated polymer is added 0.005 percent 3-n-decyl-4-hydroxy-5-(1,1-dimethyl - n - tetradecyl) - N - $\alpha$ - methylbenzyl - N - cyclohexylthiobenzamide, and the resulting product has better stability characteristics.

EXAMPLE 42

To a polyethylene having an average molecular weight of 1500, a melting point of 88–90° C. and a specific gravity of 0.92 is added 1 percent of 3,5-di-tert-butyl-4-hydroxy-N,N-dimethylthiobenzamide. After milling in the antioxidant an extremely oxidation resistant product results.

EXAMPLE 43

Two parts of the residual oil produced from the reaction of 3,5-diisopropyl-4-hydroxybenzaldehyde with morpholine and sulfur are added with milling to 100 parts of a low density polyethylene prepared by high pressure polymerization and which has an average molecular weight of about 20,000. The resulting product is vastly improved in its oxidative stability.

EXAMPLE 44

To 10,000 parts of a polyethylene having an average molecular weight of about 100,000 and which has a tensile strength of 5400 p.s.i., a Shore D hardness of 70 and a softening temperature of 130° C. under low load is added ten parts 3,5-diisopropyl-4-hydroxy-N,N-di-n-hexyldecylthiobenzamide to prepare a composition of outstanding oxidative stability.

EXAMPLE 45

To the polyethylene in Example III is added 0.05 percent 3,5-di-n-octyl-4-hydroxy-N,N-dibenzylthiobenzamide. The resulting composition has improved antioxidant characteristics.

EXAMPLE 46

Two parts of 3,5-di-tert-butyl-4-hydroxy-N-n-butyl-N-phenylthiobenzamide are added with milling to 100 parts of a low density polyethylene prepared by high pressure polymerization and which has an average molecular weight of 18,000 to 20,000. The resulting product is vastly improved in its oxidative stability.

EXAMPLE 47

To 10,000 parts of a polyethylene having an average molecular weight of about 100,000 and which has a tensile strength of 5400 p.s.i., a Shore D hardness of 70 and a softening temperature of 130° C. under low load, is added 10 parts of 3-n-decyl-4-hydroxy-5-(1,1-dimethyl-n-tetradecyl) - N - $\alpha$ - methylbenzyl - N - cyclohexylthiobenzamide to prepare a composition of outstanding oxidative stability.

EXAMPLE 48

To a polyisobutylene polymer having an average molecular weight of 35,000 is added sufficient 4-hydroxy-3,5-diisopropyl-N-n-hexyl-N-p-n-nonylphenylbenzamide to give a composition containing 0.03 percent of the antioxidant. The composition has improved antioxidant properties due to the presence of 4,4'bis(2,6-diisopropylphenol).

In addition to a product of this invention, the saturated hydrocarbon polymers of this invention may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

While $R_3$ and $R_4$ of Formula I have been described without substituents attached thereto it is to be understood that this invention is not restricted to those compounds which are only unsubstituted in those positions but extends also to those compounds where $R_3$ and $R_4$ have substituents such as alkyl, aryl, cycloalkyl, aralkyl, halogen and nitro groups.

I claim:

1. Organic material normally tending to undergo oxidative deterioration containing a small antioxidant quantity, up to 5 percent, of a compound having the formula:

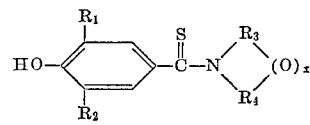

wherein $x$ is selected from 0 and 1, $R_1$ and $R_2$ are each individually selected from the group consisting of alkyl radicals containing from 1–20 carbon atoms and aralkyl radicals containing from 7–20 carbon atoms, $R_3$ and $R_4$ are, when $x$ equals 0, each independently selected from the group consisting of alkyl radicals containing 1–20 carbon atoms, cycloalkyl radicals containing 5–6 carbon atoms, aralkyl radicals containing 7–11 carbon atoms, mononuclear aryl radicals containing 6–10 carbon atoms, and alkaryl radicals containing from 7–15 carbon atoms, and, when $x$ equals 1, are ethylene radicals.

2. The composition of claim 1 containing a small antioxidant quantity, up to 5 percent, of 3,5-di-tert-butyl-4-hydroxy-N,N-dimethylthiobenzamide.

3. The composition of claim 2 wherein said organic material is a lubricating oil.

4. Organic material of claim 1 normally tending to undergo oxidative deterioration containing a small antioxidant quantity, up to 5 percent, of 2,6-di-tert-butyl-4-[morpholino-(thiocarbonyl)]phenol.

5. The composition of claim 4 wherein said organic material is a lubricating oil.

6. Organic material normally tending to undergo oxidative deterioration containing a small antioxidant quantity, up to 5 percent of the residual oil obtained from a process which comprises:

(a) reacting sulfur with a compound having the formula:

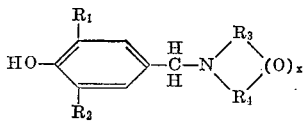

wherein $R_1$ and $R_2$ are independently selected from the group consisting of alkyl radicals of from 1 to 20 carbon atoms and aralkyl radicals of from 7 to 20 carbon atoms, and $x$ is an integer having a value from 0 to 1;

when $x$ is equal to 1, $R_3$ and $R_4$ are ethylene radicals;

when $x$ is equal to 0, $R_3$ and $R_4$ are independently selected from the group consisting of alkyl radicals of from 1 to 20 carbon atoms, cycloalkyl radicals of from 5 to 6 carbon atoms, aralkyl radicals of from 7 to 11 carbon atoms, mononuclear aryl radicals of from 6 to 10 carbon atoms, and alkaryl radicals of from 7 to 15 carbon atoms;

at a temperature of from about 100° C. to 300° C., whereby a thiobenzamide and said residual oil are formed, and (b) separating said thiobenzamide from said residual oil.

References Cited

UNITED STATES PATENTS 2,959,550  11/1960  Young et al. _____ 260—559

FOREIGN PATENTS 1,328,010  4/1963  France.

DANIEL E. WYMAN, *Primary Examiner.*

W. H. CANNON, *Assistant Examiner.*

UNITED STATES PATENT OFFICE
CERTIFICATE OF CORRECTION

Patent No. 3,413,224                                     November 26, 1968

Gordon G. Knapp

It is certified that error appears in the above identified patent and that said Letters Patent are hereby corrected as shown below:

Column 3, line 53, after the plus sign, insert -- S --. Column 7, line 15, after "n-hexyl" insert -- alcohol --. Column 12, TABLE I, second column, lines 6 and 7 thereof, "menthyl-N,N-dimenthylthiobenzanide" should read -- methyl-N,N-dimethyl-thiobenzamide --; same table, third column, line 4 thereof, "10" should read -- 1.0 --.

Signed and sealed this 10th day of March 1970.

(SEAL)
Attest:

Edward M. Fletcher, Jr.                              WILLIAM E. SCHUYLER, JR.
Attesting Officer                                             Commissioner of Patents